United States Patent [19]

Baek

[11] Patent Number: 5,073,837
[45] Date of Patent: Dec. 17, 1991

[54] LOW VOLTAGE PROTECTION CIRCUIT

[75] Inventor: Hoon-Kee Baek, Taegu, Rep. of Korea

[73] Assignee: SamSung Electronics Co., Ltd., Kyung Ki, Rep. of Korea

[21] Appl. No.: 391,990

[22] Filed: Aug. 10, 1989

[51] Int. Cl.⁵ .......................... H02H 3/24; H02J 7/04
[52] U.S. Cl. ...................................... 361/92; 361/18;
361/58; 307/66; 320/13; 320/40
[58] Field of Search .................. 361/18, 58, 86, 92;
307/66; 320/40, 39, 13, 14

[56] References Cited

U.S. PATENT DOCUMENTS

| | | | |
|---|---|---|---|
| 4,209,710 | 6/1980 | Quarton | 307/66 |
| 4,225,792 | 9/1980 | Fahey | 307/66 |
| 4,488,057 | 11/1984 | Clarke | 307/66 |
| 4,704,542 | 11/1987 | Hwang | 307/66 |

Primary Examiner—Todd E. DeBoer
Attorney, Agent, or Firm—Robert E. Bushnell

[57] ABSTRACT

There is disclosed a low voltage protection circuit for preventing overdischarging in a back-up battery. The circuit includes: switching a device which supplies voltage to the load and being connected in series between the battery and load; a charging device which charges the battery by being connected in parallel to the switching device; a first control device which determines the different operation-starting and operation-terminating voltage of the battery and, at the same time, controls the "on" and "off" of the switching device by being connected in parallel to the input terminal of the battery; and a second control device which generates hysteresis voltage between the operation-starting and operation-terminating voltage by supplying the voltage which determines the operation-terminating voltage to the first control device.

22 Claims, 2 Drawing Sheets

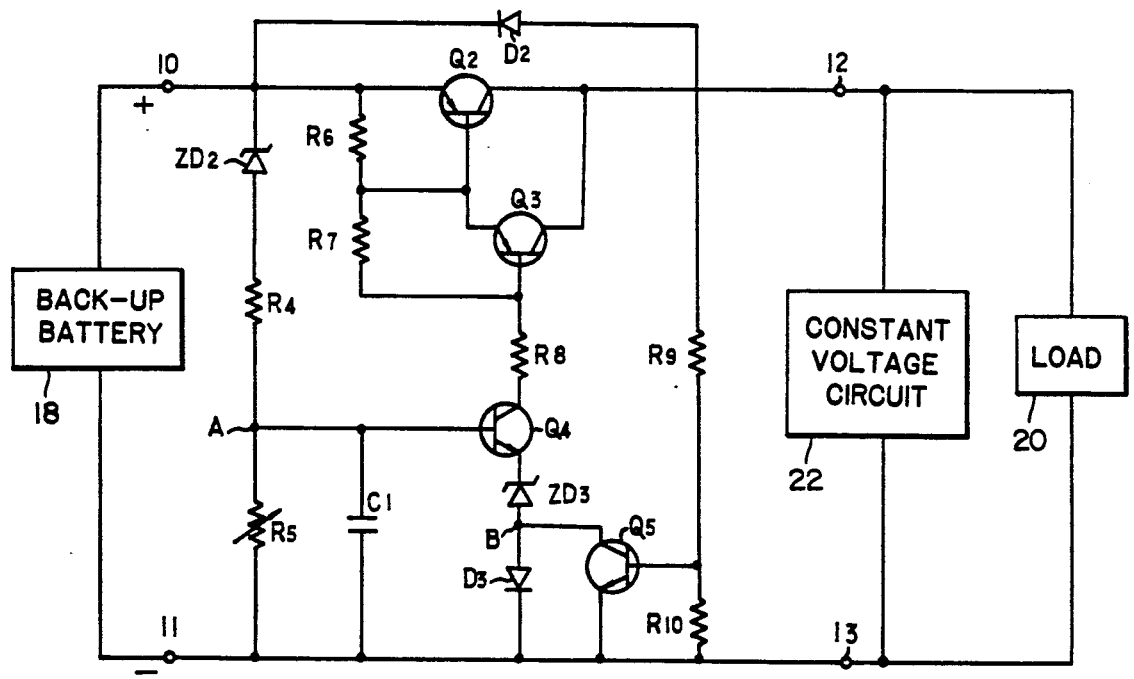
F I G. 2

LOW VOLTAGE PROTECTION CIRCUIT

BACKGROUND OF THE INVENTION

The present invention relates to a low voltage protection circuit which can be used for battery back-up.

The back-up battery is used as a power source when the power source of the system which uses a volatile, memory together with a microprocessor turns off. It is well known that the usual back-up battery has difficulty returning to normal voltage even by recharging when it is overdischarged below the required voltage, namely, termination voltage, thus shortening its life. Therefore, it is necessary for the back-up battery to be made not to discharge below termination voltage when it discharges, namely, when it is used as a power source for a load.

The circuit heretofore in use to prevent a back-up battery from overdischarging below termination voltage is formed as illustrated in FIG. 1. That is, a back-up battery is connected to terminals 1, 2 by polarity as illustrated. When the battery is charged with normal voltage, the values of resistances R2, R3 are so fixed as to enable the voltage which is inputted to the voltage on both ends of resistance R3 divided by resistances R2, R3, namely, to the reversing terminal of comparator 3 to become higher than the standard voltage by zener diode ZD1, namely, the termination voltage of the battery and the output of the comparator 3 is thereby made to output "low". Accordingly, a relay RY is prevented from being driven by turning a transistor Q1 off and a switch SW1 interlocked with the relay RY turns "on" and a switch SW2 turns "off". Thus, the voltage of the battery is supplied to the load connected to terminals 4, 5. However, when the voltage of the battery reaches termination voltage, the voltage which is inputted to the reversing terminals (−) of the comparator 3 becomes lower than the standard voltage of non-reversing terminal (+). So the output of the comparator 3 becomes "high" and the transistor Q1 turns "on". Then, the switch SW1 turns "off" by the drive of relay RY and the power source of the battery is thereby cut off from the load. At the same time, the output of the comparator 3 is made "low" and the transistor Q1 "off" by turning the switch SW2 on.

However, such a low voltage protection circuit as described hereinbefore is a mechanical-type low voltage protection circuit which employs a relay. It involves a problem in that the battery operates even in a condition where it is not charged sufficiently because it supplies power source voltage to the load with termination voltage as the starting point.

SUMMARY OF THE INVENTION

Therefore, an object of the present invention is to provide an electronic-type low voltage protection circuit designed to cut off the supply of back-up battery power source to the load even below a termination voltage.

Another object of the present invention is to provide a low voltage protection circuit in which back-up battery does not operate until before its voltage is charged to the required normal level.

The present invention is characterized in that, in order to attain such objects as described herein, it includes in the case of low voltage protection circuit designed to prevent a back-up battery from overdischarging, a switching device connected in series between the battery and load, a charging device which charges the battery, connected in parallel with the switching device a first control device which determines the different operation-starting voltage and operation-terminating voltage of the battery and, at the same time, controls the "on" and "off" of the switching device by being connected in parallel with the input terminal of the battery, and a second control device which generates hysteresis voltage between the operation-starting voltage and the operation-terminating voltage by supplying the voltage which determines the operation-terminating to the first control device.

BRIEF DESCRIPTION OF THE DRAWINGS

For a better understanding of the invention and to show how the same may be carried into effect, reference will now be made, by way of example, to the accompanying diagrammatic drawings, in which:

FIG. 2 is the present low voltage protection circuit; and

DETAILED DESCRIPTION OF THE INVENTION

Figure 1:
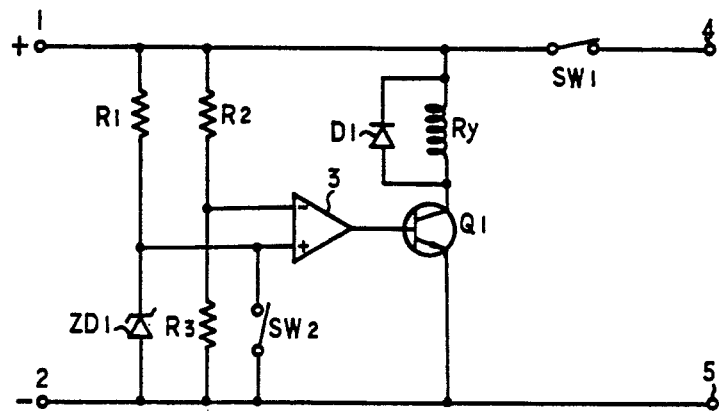
FIG. 1 is a prior low voltage protection circuit.

FIG. 2 is a low voltage protection circuit of the present back-up battery 18 ZD2 and ZD3 are zener diodes, R4–R10 are resistances, D2 and D3 are diodes, Q2–Q5 are transistors, and C1 is a capacitor.

A back-up battery is connected to terminals 10, 11 by polarity as illustrated. To terminals 12, 13 a load 20 and power source circuit 22 are connected.

The zener diode ZD2, a resistance R4 and a variable resistance R5 are connected between terminal 10 and terminal 11. A capacitor C1 is connected in parallel to variable resistance R5. To said terminals 10, 12 transistors Q2, Q3 are connected by Darlington. The of transistor Q2 emitter of transistor Q2 is connected to terminal 10 and the collectors of both transistors Q2, Q3 to terminal 12. Between the emitter and the base of each of transistors Q2, Q3 resistances R6, R7 are connected respectively. The base of transistor Q3 is connected to the collector of transistor Q4 through resistance R8. The base of transistor Q4 is connected to node A between resistance R4, R5. Then, a zener diode ZD3 and a diode D3 are connected in series to the emitter of transistor Q4 and to the common line of terminals 11 13. Resistances and to both ends of terminals 12, 13 R9, R10 are connected to the base of transistor Q5. The emitter of transistor Q5 is connected to the common line of collector terminals 11, 13 and to a node between zener diode ZD3 and diode D3. And, a unidirectional diode D2 for battery charge is connected to transistor Q2, between terminals 10, 12.

When the power source, which is the constant voltage circuit (not illustrated), connected to both ends of terminals 12, 13 is in operation, the back-up battery connected between terminals 10, 11 is charged through the diode D2 which is a charging device and, at the same time, a fixed amount of DC voltage is supplied to the load between terminals 12, 13.

However, when the power source (not illustrated) is off, the back-up battery, connected between terminals 10, 11 operates.

Supposing that the battery is sufficiently charged to normal voltage, the voltage of the charged battery is applied to both ends between terminals 10, 11 in FIG. 2 and the voltage of node A is inputted to the base of transistor Q4 by the zener diode ZD2 connected in series to resistances R4, R5 and transistor Q4 turn "on". Thus, an electric current pathway of resistance R6 - resistance R7 - resistance R8 - collector and emitter of transistor Q4-zener diode ZD3, - diode D3 is formed by the voltage of the battery and the transistors Q2, Q3 which constitute a switching device are made to turn on by bias voltage between the emitter and the base of transistors Q2, Q3 caused by a voltage drop of the resistances R6, R7. Thus, the resistance of the battery connected to both ends of terminals 10, 11 is applied to the load connected to both ends between terminals 12, 13.

Once battery voltage is supplied to the load, the voltage of resistance R10 divided by resistances R9, R10 is applied to the base of transistor Q5. Then, transistor Q5 is thereby made to turn on and the point B voltage attains to voltage produced when transistor Q5 is saturated (about 0.2V in the case of silicon transistor). Consequently, with transistor Q5 turning to the voltage between collector and emitter produced when transistor Q5 is saturated from the forward direction cut-in voltage (about 0.7V in the case of silicon diode) of diode D3 which is the point B voltage in the "off" condition, the point A voltage necessary for the "on" of transistor Q4 drops by about 0.5V (difference between the cut-in voltage 0.7V of diode D3 and the saturated voltage 0.2V of transistor Q5) from the voltage produced when transistor Q5 is off, and the difference of voltage which turns on and off the switching device includes transistors Q2, Q3 and resistances R6, R7, namely, the operation-starting voltage of battery which is supplied to the load for the first time and the operation-terminating voltage of battery are made different to the extent that the voltage of resistances R4, R5 drops due to the electric current which flows in the resistance R5 by such voltage.

Thus, a hysteresis phenomenon is presented, by which the terminating voltage is made lower than the starting voltage. This is by reason that the voltage between collector and emitter becomes lower than the cut-in voltage of diode D3 when transistor Q5 is saturated by the second control device including resistances R9, R10 and transistor Q5.

Figure 3:
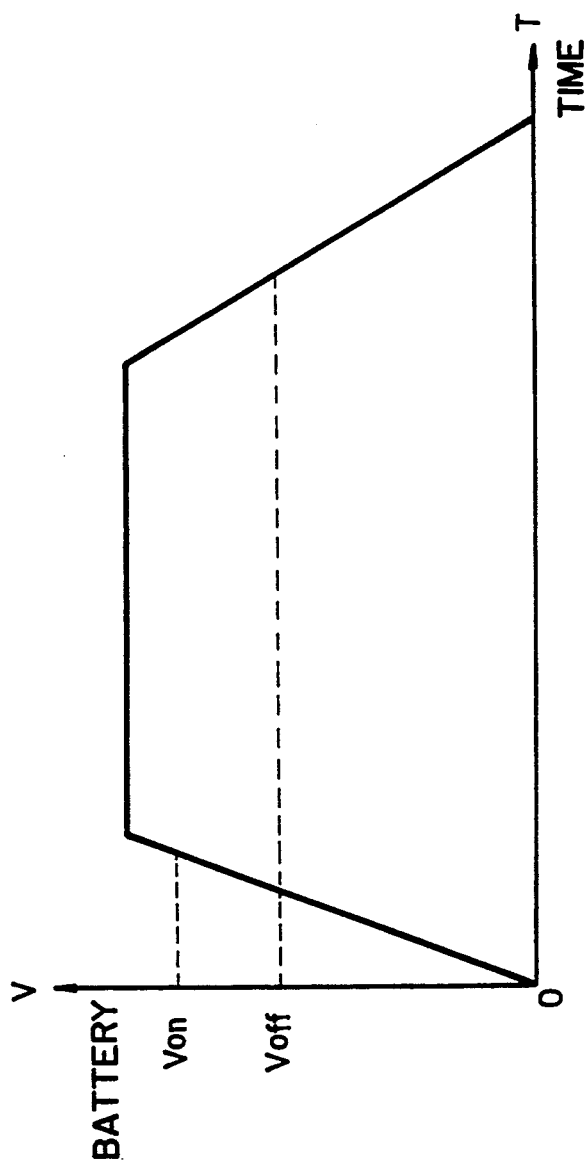
FIG. 3 is a view showing the performance of FIG. 2.

FIG. 3 is a view showing the relation between the battery voltage inputted to the terminals 10, 11 in FIG. 2 and time. In FIG. 3, VON shows operation-starting voltage and VOFF operation-terminating voltage. It indicates that there is the hysteresis relation between VON and VOFF.

Now, assuming that the back-up battery voltage which is supplied between the terminals 10, 11 in FIG. 2 is VBA, the zener-voltage of zener diodes ZD2, ZD3 are VZD2 and VZD3, the voltage between the base and the emitter for the "on" of transistor Q4 is VBE and the cut-in voltage of diode D3 is VD3, the base voltage of transistor Q4 required for the transistor Q4 to turn "on" when the transistor Q5 is "off", namely, the point A voltage VA is formalized as below:

$$VA = VBE + VZD3 + VD3 \quad (1)$$

And, the point A voltage VA by the battery voltage VBA through zener diode ZD2 and resistances R4, R5 is formalized as below:

$$VA = \frac{(VBA - VZD2) R_5}{R_4 + R_5} \quad (2)$$

Accordingly, if the base current is disregarded by an extremely small value when the transistor Q4 is on, the electric current I which flows in the resistance R5 is formalized by 1 as below:

$$I = \frac{VA}{R_5} = \frac{VBE + VZD3 + VD3}{R_5} \quad (3)$$

As stated above, therefore, the operation-starting voltage VON of battery for turning "on" of transistors Q2, Q3 which constitute a switching device by turning "on" of transistor Q4 can be formalized as below:

$$VON = VZD2 + (R4 + R5)I = VZD2 + \quad (4)$$

$$\frac{R_4 + R_5}{R_5} (VBE + VZD3 + VD3)$$

From the above formula 4, one comes to know that the operation-starting voltage VON is adjustable by a proper value if variable resistance R5 is adjusted.

Therefore, the operation-starting voltage VON can be set by the first control means which includes zener diode ZD2, resistances R4, R5, R8, transistor Q4, zener diode ZD3 and diode D3 and the low voltage protection circuit in FIG. 2 can be made to operate only when the battery is charged beyond the operation-starting voltage VON.

As to the operation-terminating voltage VOFF of the battery, it is determined as shown below. As transistors Q2, Q3 which constitute a switching device are already "on", the transistor Q5 is in the saturated condition. Now, supposing that the voltage between collector and emitter is VCE when the transistor Q5 is in the saturated condition, VCE<VD3. So, the base voltage of transistor Q4 required for turning "on" transistor Q4, namely, the point A voltage VA is formalized as below:

$$VA = VBE + VZD3 + VCE \quad (5)$$

The electric current I' which flows in the resistance R5 at this time if formalized by formula 5 as below:

$$I' = \frac{VA}{R_5} = \frac{VBE + VZD3 + VCE}{R_5} \quad (6)$$

Accordingly, the operation-terminating voltage VOFF of battery in FIG. 3 is formalized as below:

$$VOFF = VZD2 + (R4 + R5)I' = VZD2 + \quad (7)$$

$$\frac{R_4 + R_5}{R_5} (VBE + VZD3 + VCE)$$

Therefore, the hysteresis voltage VON - VOFF by the formulas 4, 7 can be expressed as below:

$$VON - VOFF = \frac{R_4 + R_5}{R_5} (VD3 - VCE) \quad (8)$$

But, as the forward direction cut-in voltage of silicon diode is VD3≈0.7V and the voltage between collector and emitter is VCE≈0.2V when the transistor Q5 is saturated, the formula 8 can be expressed as below:

$$VON - VOFF = \frac{1}{2}\left(1 + \frac{R_4}{R_5}\right) \quad (9)$$

Consequently, the hysteresis voltage VON-VOFF is properly adjustable, as obtainable from formula 9 taking advantage of the transistor Q5 saturated by the second control device which includes resistances R9, R10 and transistor Q5 and, at the same time, the value of operation-terminating voltage VOFF can also be set at the prescribed terminating voltage of battery in use.

Thus, when battery voltage drops below terminating voltage VOFF, transistor Q4 turns "off" and transistors Q2, Q3 turn "off" and battery voltage is not supplied to the load.

As described hereinabove, the present invention is advantageous in that it is convenient to use because it can be used after the battery is sufficiently charged to normal operation voltage as the operation-starting and -terminating voltage of battery is freely adjustable by use of electronic method and the operation-terminating voltage is also adjustable in a simple way.

The foregoing description shows only a preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A low voltage protection circuit for preventing overdischarging of a back-up battery, said circuit comprising:
    switching means, for supplying a first voltage to a load, connected in series between said battery and load;
    charging means, for charging said battery with a second voltage, connected in parallel with said switching means;
    first control means, for determining different operation starting and operation-terminating voltages of said battery while said second voltage is off and controlling "on" and "off" of said switching means; connected in parallel with said battery; and
    second control means, for generating and supplying a voltage to said first control means for adjusting the operation-terminating voltage.

2. A circuit as claimed in claim 1, wherein said switching means comprises;
    a plurality of first transistors connected in a Darlington configuration; and
    a plurality of first resistors, each of said resistors being connected between an emitter and a base of a respective transistor of said plurality of first transistors.

3. A circuit as claimed in claim 1, wherein said first control means comprises:
    first and second resistors connected in series;
    a first zener diode connected between said first resistor and a positive terminal of said battery;
    a first transistor having a base connected to a first common connection point between said first and second resistors;
    a second zener diode coupled to an emitter of said first transistor;
    a first diode coupled between said second zener diode and a second common connection point between a negative terminal of said battery and an output terminal of said circuit; and
    a third resistor connected to a collector of said second transistor.

4. A circuit as claimed in claim 3, further comprising a capacitor coupled between the base of said first transistor and the second common connection point.

5. A circuit as claimed in claim 4, wherein said second control means comprises:
    a fourth and fifth resistors; and
    a third transistor having a base connected to a third common connection point between said fourth and fifth resistors, an emitter connected to the second common connection point and a collector connected to a point between said first diode and second zener diode.

6. A circuit as claimed in claim 1, wherein said charging means is a first diode.

7. A circuit as claimed in claim 2, wherein said plurality of first transistors of said switching means are activated by said first control means.

8. A method of electrically preventing overdischarging of a back-up battery, comprising the steps of:
    charging a back-up battery;
    activating the back-up battery by supplying a first voltage of sufficient value to turn "ON" a first transistor;
    turning "ON" a switching circuit automatically upon turning "ON" of said first transistor;
    supplying a second voltage to a load through said switching circuit;
    turning "ON" and saturating a second transistor causing the first voltage supplied to said first transistor to decrease;
    turning "OFF" said first transistor and said switching circuit automatically upon the decrease of the first voltage to a certain level to terminate the supply of the second voltage to the load.

9. A low voltage protection circuit for preventing overdischarging of a back-up battery, comprising:
    switching means for permitting and impeding flow of a first voltage from said battery to a load;
    charging means, connected to parallel with said switching means, for charging said battery;
    first control means coupled to enable said switching means at a starting voltage; and
    second control means coupled to said first control means to provide a second voltage, determining a terminating voltage, to said first control means;
    said terminating voltage being different than said starting voltage when said switching means is enabled responsive to said primary source being off.

10. A circuit as claimed in claim 9, wherein said switching means comprises;
    a plurality of first transistors connected in a Darlington configuration; and
    a plurality of first resistors, each of said resistors being connected between an emitter and a base of a respective transistor of said plurality of first transistors.

11. A circuit as claimed in claim 10, wherein said first control means comprises:
    second and third resistors connected in series;

a first zener diode connected between said second resistor and a positive input terminal of said battery;

a second transistor having a base connected to a first common connection point between said second and third resistors;

a second zener diode coupled to an emitter of said second transistor;

a first diode coupled between said second zener diode and a second common connection point between a negative terminal of said battery and an output terminal of said circuit; and a fourth resistor connected to a collector of said second transistor.

12. A circuit as claimed in claim 11, further comprising a capacitor coupled between the base of said second transistor and the second common connection point.

13. A circuit as claimed in claim 12, wherein said second control means comprises:

a plurality of fifth resistors; and a third transistor having a base connected to a third common connection point between said plurality of fifth resistors, an emitter connected to the second common connection point and a collector connected to a point between said first diode and second zener diode.

14. A circuit as claimed in claim 9, wherein said charging means is a second diode.

15. A circuit as claimed in claim 10, wherein said plurality of first transistors of said switching means are activated by said first control means.

16. A low voltage protection circuit, comprising:

first terminal means for receiving energy from power source;

second terminal means for receiving energy from a back-up battery;

a load;

switching means for supplying first voltage to said load, connected in series between said second terminal means and load;

charging means, coupled to said first terminal means and connected in parallel with said switching means, for charging a battery with a second voltage from the power source;

first control means, for determining different operation-starting and operation-terminating voltages of the battery when said power source is off and controlling "on" and "off" of said switching means, connectable in parallel with the battery; and second control means, for generating and supplying a voltage to said first control means for determining the operation-terminating voltage.

17. A circuit as claimed in claim 16, wherein said switching means comprises;

a plurality of first transistors connected in a Darlington configuration; and a plurality of first resistors, each of said resistors being connected between an emitter and a base of a respective transistor of said plurality of first transistors.

18. A circuit as claimed in claim 17, wherein said first control means comprises:

second and third resistors connected in series;

a first zener diode connected between said second resistor and a positive input terminal of said battery;

a second transistor having a base connected to a first common connection point between said second and third resistors;

a second zener diode coupled to an emitter of said second transistors;

a first diode coupled between said second zener diode and a second common connection point between a negative terminal of said battery and an output terminal of said circuit; and a fourth resistor connected to a collector of said second transistor.

19. A circuit as claimed in claim 18, further comprising a capacitor coupled between the base of said second transistor and the second common connection point.

20. A circuit as claimed in claim 18, wherein said second control means comprises:

a plurality of fifth resistors; and a third transistor having a base connected to a third common connection point between said plurality of fifth resistors, an emitter connected to the second common connection point and a collector connected to a point between said first diode and second zener diode.

21. A circuit as claimed in claim 16, wherein said charging means is a second diode.

22. A circuit as claimed in claim 17, wherein said plurality of first transistors of said switching means are activated by said first control means.

* * * * *

UNITED STATES PATENT AND TRADEMARK OFFICE
CERTIFICATE OF CORRECTION

PATENT NO. : 5,073,837
DATED : 17 December 1991
INVENTOR(S) : Hoon-Kee BAEK It is certified that error appears in the above-identified patent and that said Letters Patent is hereby corrected as shown below:

Column 1, Line 18, replace "in use" with --is used--;

Column 2, Line 19, replace "prior" with --conventional--;

Line 38, delete "of tran-";

Line 39, delete "sistor Q2";

Column 3, Line 42, replace "This is by reason that" with --The reason for this is that--;

Claim 2, Column 5, Line 54, replace the semicolon with a colon;

Claim 10, Column 6, Line 59, replace the semicolon with a colon;

Claim 17, Column 8, Line 7, replace the semicolon with a colon.

UNITED STATES PATENT AND TRADEMARK OFFICE
CERTIFICATE OF CORRECTION

PATENT NO. : 5,073,837

DATED : 17 December 1991

INVENTOR(S) : Hoon-Kee BAEK

It is certified that error appears in the above-identified patent and that said Letters Patent is hereby corrected as shown below:

Claim 17, Column 8, Line 7, replace the semicolon with a colon.

Signed and Sealed this

Twenty-third Day of March, 1993

Attest:

STEPHEN G. KUNIN

*Attesting Officer*  *Acting Commissioner of Patents and Trademarks*